(12) United States Patent
Zaarur

(10) Patent No.: US 9,032,234 B2
(45) Date of Patent: May 12, 2015

(54) SYSTEMS AND METHODS FOR MONITORING AND MANAGING MEMORY BLOCKS TO IMPROVE POWER SAVINGS

(75) Inventor: Ofer Zaarur, Brookline, MA (US)

(73) Assignee: Marvell World Trade Ltd., St. Michael (BB)

(*) Notice: Subject to any disclaimer, the term of this patent is extended or adjusted under 35 U.S.C. 154(b) by 384 days.

(21) Appl. No.: 13/616,313

(22) Filed: Sep. 14, 2012

(65) Prior Publication Data

US 2013/0073886 A1    Mar. 21, 2013

Related U.S. Application Data

(60) Provisional application No. 61/536,258, filed on Sep. 19, 2011, provisional application No. 61/659,238, filed on Jun. 13, 2012.

(51) Int. Cl.
```
G06F 1/00      (2006.01)
G06F 1/32      (2006.01)
G06F 12/00     (2006.01)
G06F 13/00     (2006.01)
G06F 12/02     (2006.01)
```

(52) U.S. Cl.
CPC ............ *G06F 12/023* (2013.01); *G06F 1/3225* (2013.01); *G06F 1/3275* (2013.01); *G06F 2212/1028* (2013.01); *Y02B 60/1225* (2013.01); *Y02B 60/32* (2013.01)

(58) Field of Classification Search
None
See application file for complete search history.

(56) References Cited

U.S. PATENT DOCUMENTS

| | | | |
|---|---|---|---|
| 5,524,248 A * | 6/1996 | Parks et al. | 713/324 |
| 6,260,151 B1 * | 7/2001 | Omizo et al. | 713/324 |
| 7,757,039 B2 * | 7/2010 | Kaburlasos et al. | 711/106 |
| 2003/0023825 A1 * | 1/2003 | Woo et al. | 711/170 |
| 2004/0148481 A1 * | 7/2004 | Gupta | 711/165 |
| 2006/0181949 A1 | 8/2006 | Kini | |
| 2007/0005998 A1 | 1/2007 | Jain et al. | |
| 2007/0011421 A1 | 1/2007 | Keller, Jr. et al. | |
| 2008/0005516 A1 | 1/2008 | Meinschein et al. | |
| 2008/0313482 A1 | 12/2008 | Karlapalem et al. | |
| 2011/0145609 A1 * | 6/2011 | Berard et al. | 713/320 |

OTHER PUBLICATIONS

International Search Report and Written Opinion of the International Searching Authority for Application PCT/US2012/055512 dated Nov. 7, 2012 (11 pages).

* cited by examiner

*Primary Examiner* — Ji H Bae

(57) ABSTRACT

Systems and methods are provided for placing a portion of a memory into a low power mode. A system includes a hot spot region creator configured to determine an activity level for each of a plurality of regions of a memory, where certain of the regions are determined to be active regions, and where certain of the regions are determined to be inactive regions and rearrange the data to position the active region data in a contiguous active portion of memory and to position the inactive regions data in a contiguous inactive portion of memory. A memory controller is configured to place the contiguous inactive portion of memory into a low power mode.

18 Claims, 14 Drawing Sheets

SYSTEMS AND METHODS FOR MONITORING AND MANAGING MEMORY BLOCKS TO IMPROVE POWER SAVINGS

CROSS-REFERENCE TO RELATED APPLICATIONS

This application claims priority to U.S. Provisional Patent Application No. 61/536,258, filed Sep. 19, 2011, entitled "Monitoring and Managing RAM Blocks to Improve Power Saving on Application Processors," and U.S. Provisional Application No. 61/659,238, filed Jun. 13, 2012, entitled "Method to Manage Memory Subsystem to Create Hot and Cold Spot Segments," both of which are herein incorporated by reference in their entirety.

FIELD

The technology described herein relates generally to memory management and more particularly to memory management for power savings.

BACKGROUND

A typical memory, such as a random access memory (RAM), accepts an address as an input and, in response, outputs one or more data values corresponding to that address as an output. Such memories are typically powered, where a system experiences a constant power drain during any period where those memories are in an on-state.

SUMMARY

Examples of systems and methods are provided for placing a portion of a memory into a low power mode. A system includes a hot spot region creator configured to determine an activity level for each of a plurality of regions of a memory, where certain of the regions contain data, where certain of the regions are determined to be active regions, and where certain of the regions are determined to be inactive regions, and to rearrange the data to position the active region data in a contiguous active portion of memory and to position the inactive region data in a contiguous inactive portion of memory. A memory controller is configured to place the contiguous inactive portion of memory into a low power mode.

As another example, a method of placing a portion of a memory into a low power mode includes determining an activity level for each of a plurality of regions of a memory, where certain of the regions contain data, where certain of the regions are determined to be active regions, and where certain of the regions are determined to be inactive regions. The data is rearranged to position the active region data in a contiguous active portion of memory and to position the inactive region data in a contiguous inactive portion of memory. The contiguous inactive portion of memory is placed into a low power mode.

As a further example, a system on chip includes a data processor and a non-transitory computer-readable memory that is responsive to the data processor. A hot spot region creator is configured to determine an activity level for each of a plurality of regions of the memory, where certain of the regions contain data, where certain of the regions are determined to be active regions, and where certain of the regions are determined to be inactive regions, and to rearrange the data to position the active region data in a contiguous active portion of memory and to position the inactive region data in a contiguous inactive portion of memory. A memory controller is configured to place the contiguous inactive portion of memory into a low power mode.

BRIEF DESCRIPTION OF TILE DRAWINGS

DETAILED DESCRIPTION

Figure 1:
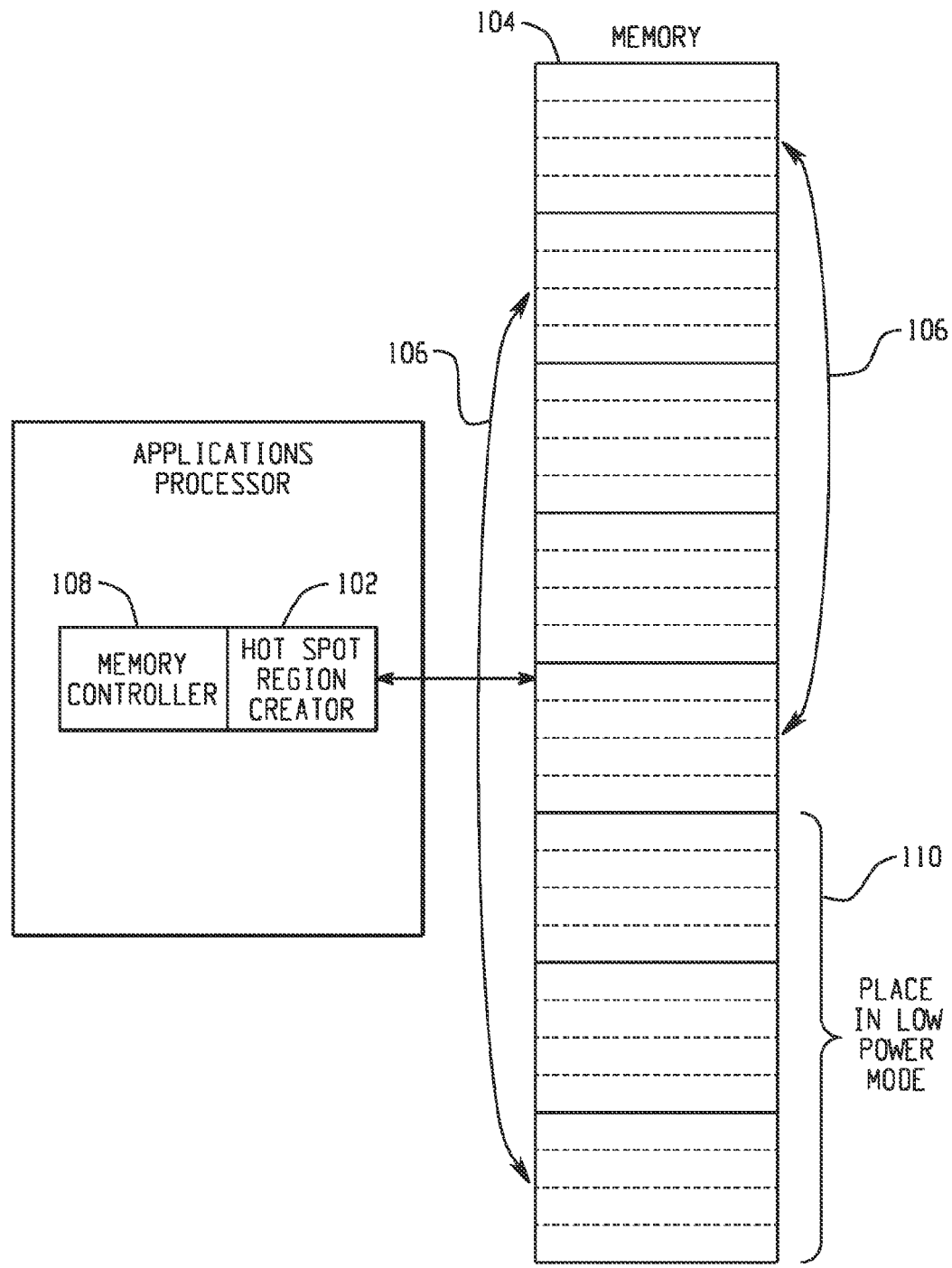
FIG. 1 is a block diagram depicting a system configured to place a portion of a memory into a low power mode.

FIG. 1 is a block diagram depicting a system configured to place a portion of a memory into a low power mode. The system includes a hot spot region creator 102. The hot spot region creator 102 is configured to determine an activity level for each of a plurality of regions of a memory 104. Certain of the regions of the memory 104 are determined to be active regions, and certain of the regions of the memory 104 are determined to be inactive regions. The hot spot region creator 102 is also configured to rearrange the data in the memory 104, as indicated at 106, to position the active regions in a contiguous active portion of memory and to position the inactive regions in a contiguous inactive portion of memory. The system further includes a memory controller 108 that is configured to place the contiguous inactive portion of memory 110 into a low power mode.

A hot spot region creator 102 can monitor and manage memory regions (e.g., Random Access Memory (RAM)) to create hot spot areas that can be leveraged for improved power consumption by providing a higher power level to portions of the memory 104 that are being actively accessed. For example, a hot spot region creator 102 can be beneficial in power constrained systems such as mobile consumer electronics products. A hot spot region creator 102 can be utilized in a memory (RAM) on demand system, where regions of a memory are placed into different power modes (e.g., high power mode, tow power mode, disabled) to improve power consumption characteristics.

Memory accesses in a system tend to occur according to a distribution. For example, a certain application or operating system may access certain memory locations at a different frequency than other applications or operating systems. Further, a system that is performing one type of activity may tend to access certain memory locations more than others, while the distribution of memory accesses for another type of activity may differ. Memory access distributions may be influenced by a number of factors including:

—System Architecture—A system architecture may be divided into several controllers or chip select configurations. These configurations can create direct memory addresses to be accessed by different peripherals or other subsystems. Which peripherals and subsystems are active during a particular activity type will influence the distribution of memory accesses during performance of that activity.

—Memory Address Translation—Memory address translation defines an address mapping structure. For example, a system can be configured for bank, row, column (BRC) access or row, bank, column (RBC) access. In BRC translation mode, the memory address map is linear between the address and the physical location at the memory array level in an RBC mode, the access distribution between banks tends to be more evenly distributed.

—Cache Architecture—A cache architecture can influence memory access frequency and distribution. When a cache is large and a system is executing loop code that resides in the cache, there will tend to be fewer memory accesses.

—Software architecture and usage—The process of allocating and de-allocating memory can be dependent on the software memory architecture. For example, a system may allocate specific reserved memory to a driver or application component. When that driver or application is being used in a current activity, the allocated memory will be accessed more frequently, while other drivers or applications that are not active will have no access to their memory area.

These factors and others result in a memory access distribution that can be utilized by a hot spot region creator 102 to improve power utilization performance by a system. A hot spot region creator 102 can monitor current system memory accesses to determine the memory access distribution, or the hot spot region creator 102 can utilize pre-defined information about current or upcoming activity (e.g., the operating system in use, the current application in use, a current activity being performed, an upcoming activity to be performed) to adjust the memory 104 to improve power utilization performance.

Figure 2:
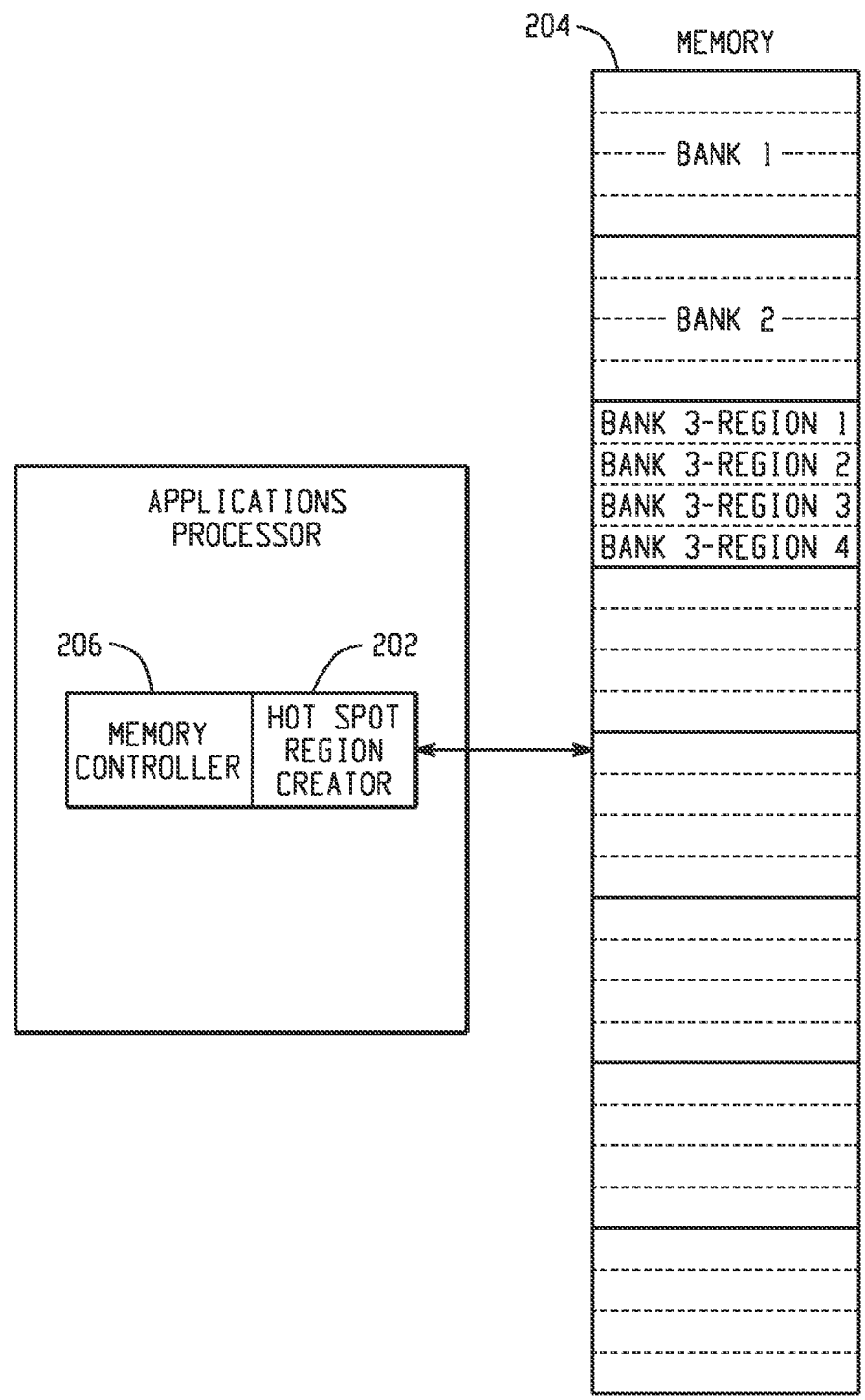
FIG. 2 is a block diagram depicting example divisions of a memory that can be controlled by a hot spot region creator and memory controller.

FIG. 2 is a block diagram depicting example divisions of a memory (e.g., a double data rate synchronous dynamic random-access memory (DDR SDRAM)) that can be controlled by a hot spot region creator and memory controller. A hot spot region creator 202 determines an activity level for a plurality of regions of a memory 204 and rearranges data in the memory 204 according to those activity levels. A memory controller 206 places a portion of the memory 204 into a low power mode to achieve a power savings in operating the memory. For example, the hot spot region creator 202 may monitor memory accesses (e.g., read and write requests) to a plurality of memory banks (e.g., Bank 1, Bank 2, . . . ) of the memory 204. The hot spot region creator 202 may monitor which pages (or regions of 1 to several pages) of those banks are accessed, such as by counting requests for accessing each particular page (e.g., Bank 3—Region 1, Bank 3—Region 2, Bank 3—Region 3, Bank 3—Region 4). Based on these counts, the hot spot region creator 202 determines an activity level for each of those regions (e.g., Bank 3—Region 1—High Activity, Bank 3—Region 4—Medium Activity, Bank 3—Region 2—Low Activity). The hot spot region creator 202 then rearranges the data according to the activity levels. For example, the hot spot region creator 202 may position the active region data together in a contiguous active portion of memory, the medium activity region data together in a contiguous medium activity portion of memory, and the low activity data together in a contiguous low activity portion of memory. Power settings for the portions of memory can then be set accordingly (e.g., the high activity region of memory is placed in a high power mode, the medium activity region of memory is placed in a medium power mode, and the low activity region of memory is placed in a low power mode or disabled mode).

Figure 3:
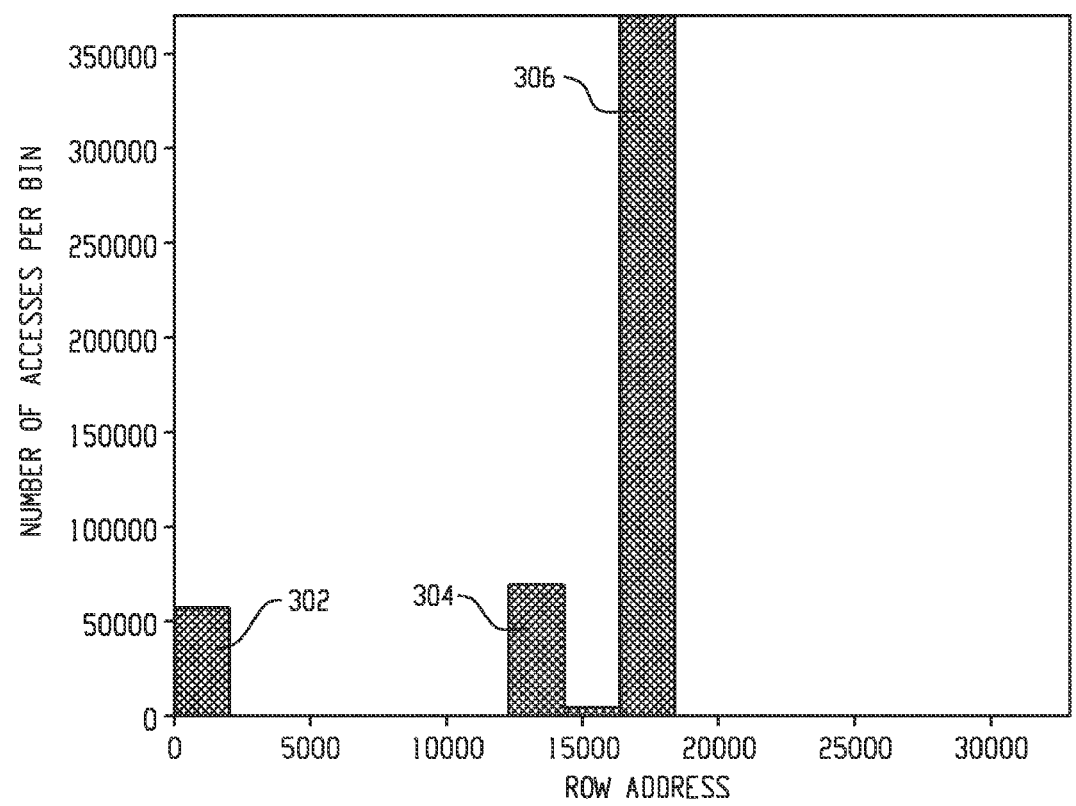
FIG. 3 is a graph depicting an example memory access distribution.

FIG. 3 is a graph depicting an example memory access distribution. In the example of FIG. 3, a memory is divided into a number of bins, and memory accesses to addresses (e.g., pages, rows) in those bins are counted. The memory accesses counted fall mainly within three bins: a first bin 302 located in low memory addresses, a second bin 304 located in mid-memory addresses, and a third bin 306 also located in mid-memory addresses. Based on these counts, a hot spot region creator can determine activity levels for these particular regions 302, 304, 306.

The exact activity level determined by the hot spot region creator may be dependent on an activity level scheme definition. For example, one scheme definition may state that memory regions are determined to be one of two states: active regions and inactive regions. In another scheme, memory regions may be defined as being high activity regions, mid-activity regions, and low activity regions. Other schemes having other number of activity types may also be applied. For example, a number of activity levels available to a hot spot region creator may be based on a number of memory activity modes (e.g., high power mode, mid-power mode, low power mode, disabled) that can be controlled by the hot spot region creator or other memory controller.

In one example, where three activity levels are available for assignment, region 306 may be determined to be a high activity region, regions 302 and 304 may be determined to be mid-activity regions, and the remaining regions may be determined to be low activity regions. In another example, where two activity levels are available for assignment, regions 302, 304, and 306 may be determined to be active regions, while the remaining regions may be determined to be inactive regions.

Figure 4:
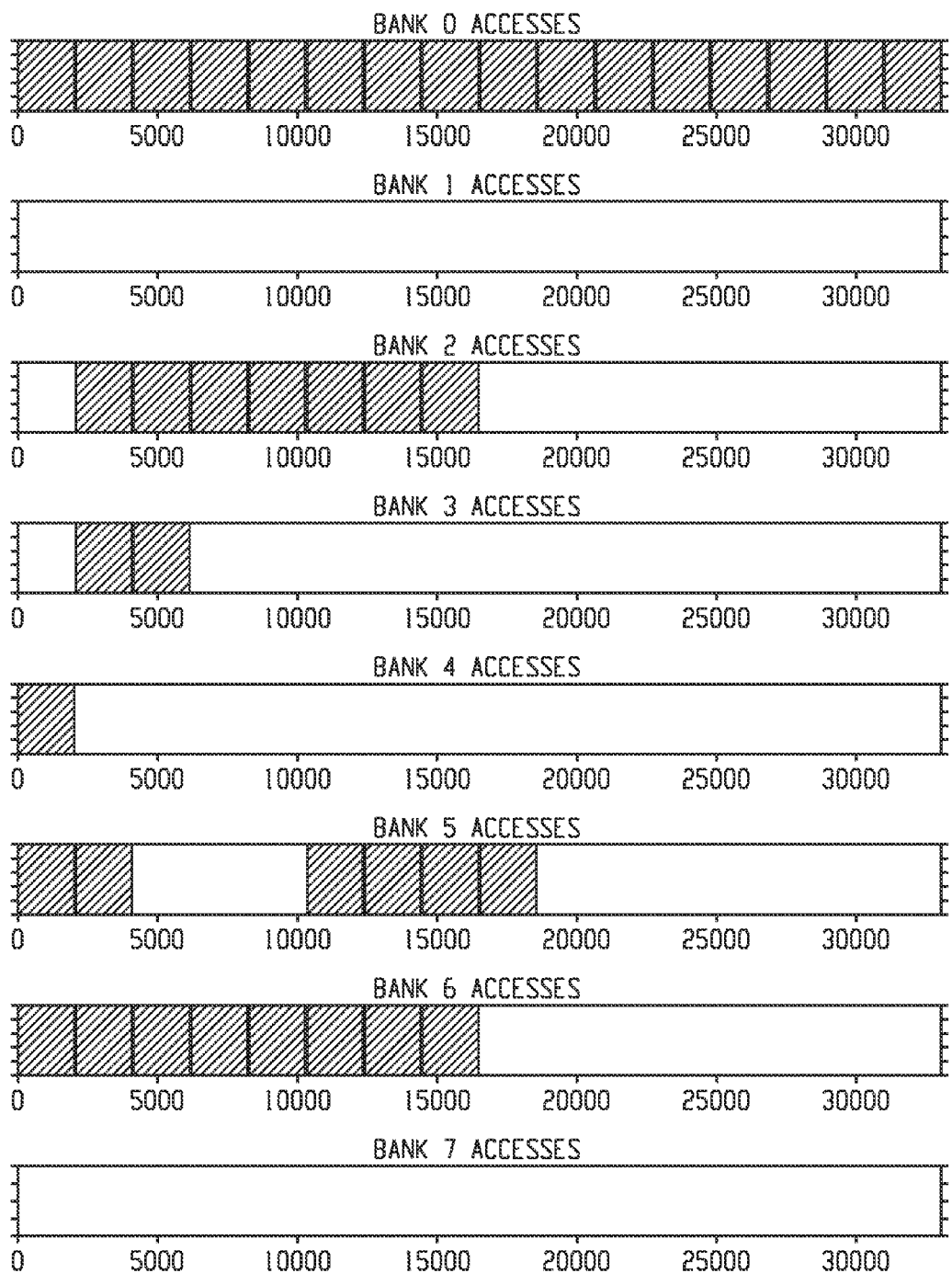
FIG. 4 is a graph depicting an assigning of activity levels to regions of memory where two activity levels are available for assigning.

FIG. 4 is another graph depicting an assigning of activity levels to regions of memory where two activity levels are available for assigning. FIG. 4 depicts eight banks of memory, where each bank of memory is divided into sixteen memory regions. The regions (pages) of memory are determined to be either active regions, denoted by solid blocks, or inactive regions, identified by empty spaces. Certain of the memory banks (e.g., Bank 0) have memory accesses (or more than a threshold amount of memory accesses) detected at each region. Other memory banks (e.g., Bank 1, Bank 7) have no memory accesses detected in any regions. Other memory banks (e.g., Bank 2, Bank 3, Bank 4, Bank 5, Bank 6) have memory accesses detected in some regions and no memory accesses detected in other regions.

The memory depicted in FIG. 4 may exhibit less than optimal power usage characteristics when all of the memory banks are powered during system operation. For example, the power supplied to Bank 1 and Bank 7 may be a wasteful expenditure when those memory banks are not expected to be accessed. In one example, power may be saved by configuring Bank 1 and Bank 7 to a low power mode because it is unlikely that the data contained in Bank 1 and Bank 7 will be needed during current activity (e.g., by the current application, by the current operating system, the current activity being performed by an application). Such a configuration may be desirable when the power savings achieved by changing Bank 1 and Bank 7 to a low power mode outweighs the cost of activating those banks if a request is received to access data in those banks.

Figure 5:
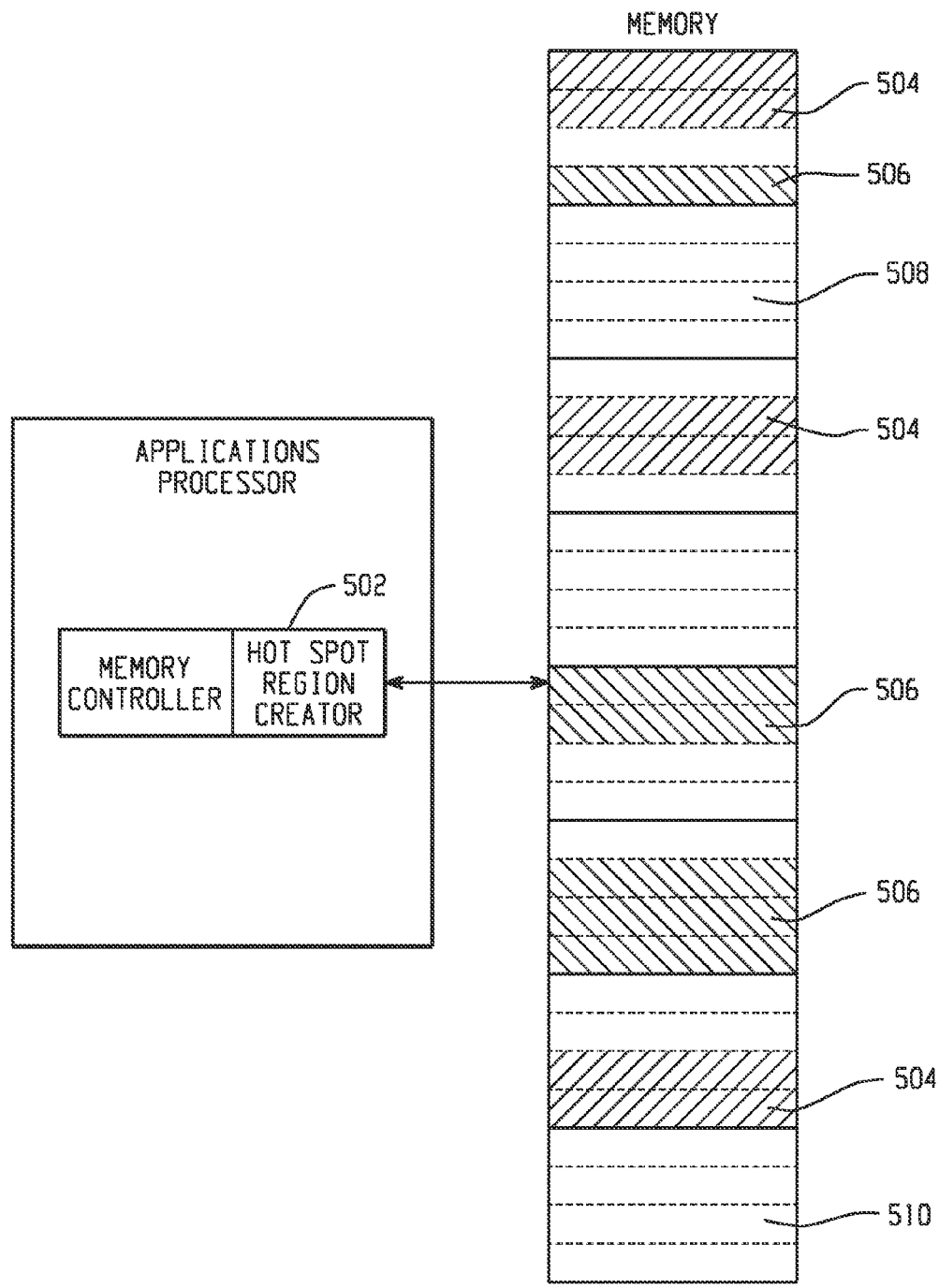
FIG. 5 is a block diagram depicting determined activity levels of each of a plurality of regions of memory.
Figure 6:
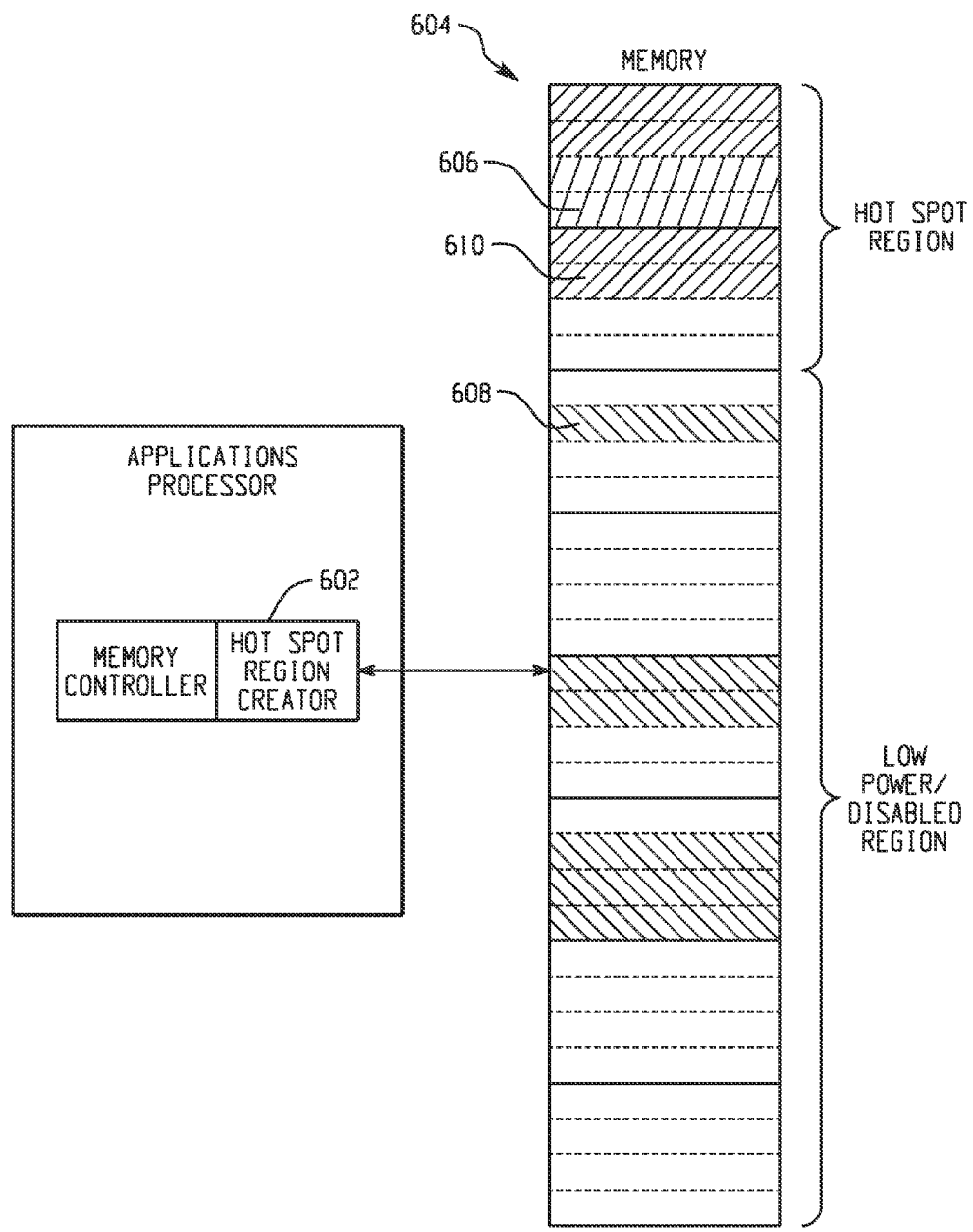
FIG. 6 is a block diagram depicting a memory that has been rearranged to position the active region data in a contiguous active portion of memory.
Figure 7:
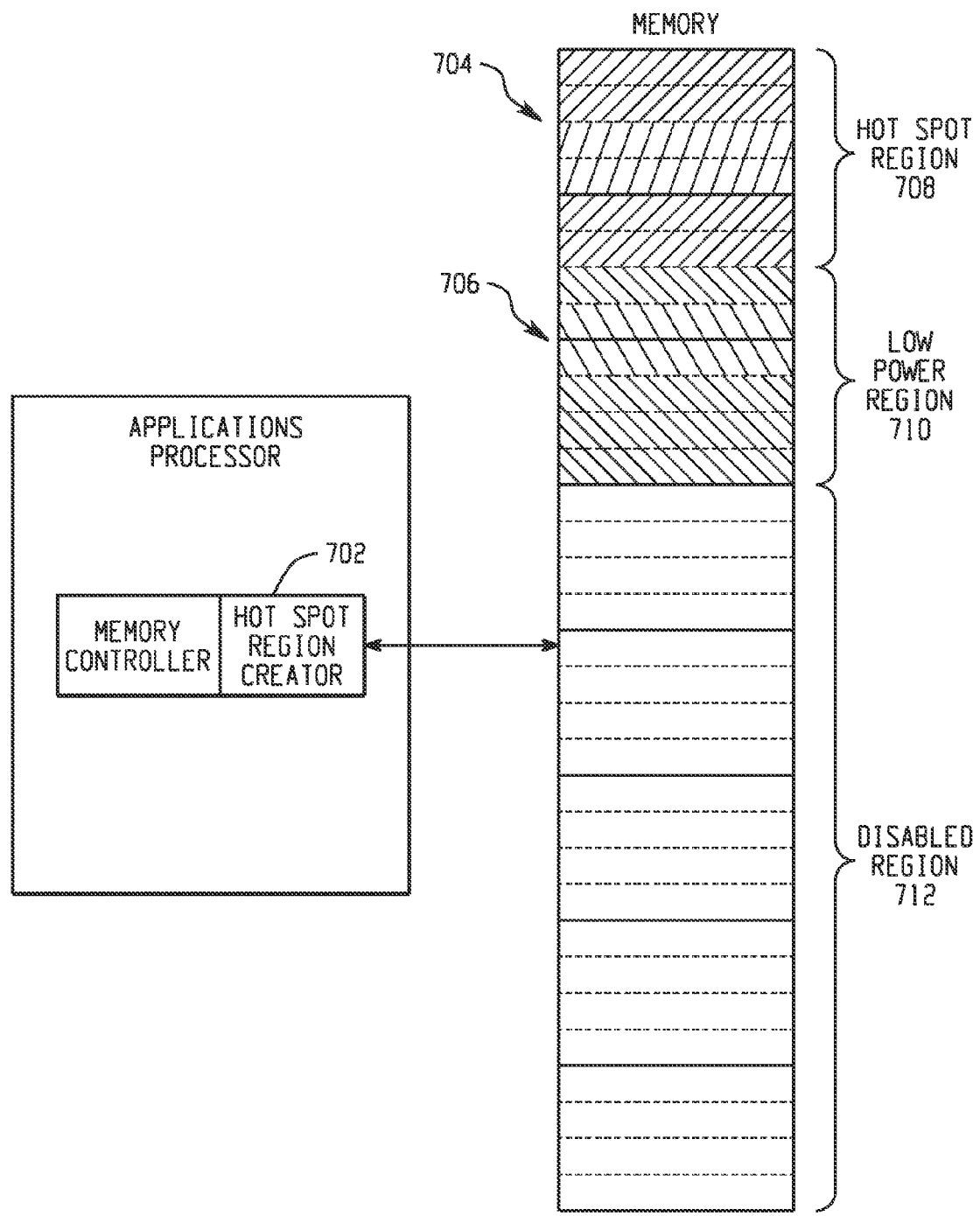
FIG. 7 is a block diagram depicting a memory that has been rearranged to position the active region data in a contiguous active portion of memory and to position occupied but inactive regions in a contiguous occupied portion of memory.

Further improvements in power savings can be achieved by implementing a rearranging of data in a memory. FIGS. 5-7 provide an example of such a rearranging. FIG. 5 is a block diagram depicting determined activity levels of each of a plurality of regions of memory. A hot spot region creator 502 determines that certain regions (e.g., certain pages of certain memory banks) 504 are active regions, certain regions 506 are occupied but inactive regions, and certain other regions are unoccupied inactive regions. Bank 1 508 and Bank 7 510 contain only unoccupied inactive regions. Thus, as noted above, a power savings could be achieved by placing those banks 508, 510 into a low power or disabled mode.

Additional power savings may be achieved by rearranging data contained within the memory. FIG. 6 is a block diagram depicting a memory that has been rearranged to position the active region data in a contiguous active portion of memory. Based on the assignment of activity levels to different regions of memory, the hot spot region creator 602 is configured to rearrange the data to position the active region data 604 in a contiguous active portion of memory (i.e., the hot spot region at the low memory addresses in the example of FIG. 6). Such rearranging may be accomplished using a variety of rearrangement algorithms, as described in further detail herein with respect to FIG. 14. In one example, data from each region of memory determined to be an active region is exchanged with the first data or empty storage encountered at the tow memory addresses that is not associated with an active region. When data is present at the next non-active data location, the present data is exchanged with the data from the active region that is being moved (e.g., the active data at 606 is exchanged with the inactive data at 608). When no data is present at the next non-active data location, the data from the active region is placed in that empty space (e.g., the data at 610 is placed in the empty space in Bank 1). After rearranging, Bank 0 and Bank 1 contain active data, are deemed a hot spot region, and are maintained in an active power mode. The remainder of the memory, Banks 2-7, may be deemed inactive regions and be placed in a low power or disabled mode. In another alternative, Bank 2, Bank 4, and Bank 5, which contain occupied but inactive regions, may be placed in a low power mode while Bank 3, Bank 6, and Bank 7 are placed in a disabled mode. Such arrangements can improve power performance over the configuration of FIG. 5 where only two banks can be placed in a disabled mode.

Data rearrangements and swaps may be tracked in a variety of ways. For example, a data rearrangement map may be implemented to translate a prior memory address to a current memory address. For example, active region memory that resided in Bank 6 may be moved to Bank 2 when rearranged. A data rearrangement map may track this movement so that when an application or hardware attempts to access the data at its old location address, that old location address can be translated to the current address following rearrangement. Because in some examples, the power savings benefits outweigh the time cost associated with address translation using the data rearrangement map, the hot spot region creator 602 operation results in a net gain to the system.

FIG. 7 is a block diagram depicting a memory that has been rearranged to position the active region data in a contiguous active portion of memory and to position occupied but inactive regions in a contiguous occupied portion of memory. In FIG. 7, a hot spot region creator has identified certain regions of memory as active regions, certain regions of memory as occupied inactive regions, and certain regions as unoccupied, inactive regions. The hot spot region creator 702 rearranges the data so that the active region data is positioned in a contiguous active portion 704 of the memory and so that the occupied but inactive region data is positioned in a contiguous occupied portion 706 of the memory. In one example, the regions of memory containing the active region data are deemed hotspot regions 708 and are placed in a high power mode. The regions of memory containing the occupied but inactive data are deemed low power regions 710 and are placed in a lower power mode. The regions of memory containing no data are deemed a disabled region 712 and placed in a disabled mode (Bank 3, Bank 4, Bank 5, Bank 6, and Bank 7 disabled). In another example, the hot spot region 708 may be placed in an active mode, and the low power region 710 and the disabled region 712 may be placed in a disabled mode to achieve additional power savings (Bank 2, Bank 3, Bank 4, Bank 5, Bank 6, and Bank 7 disabled).

Figure 10:
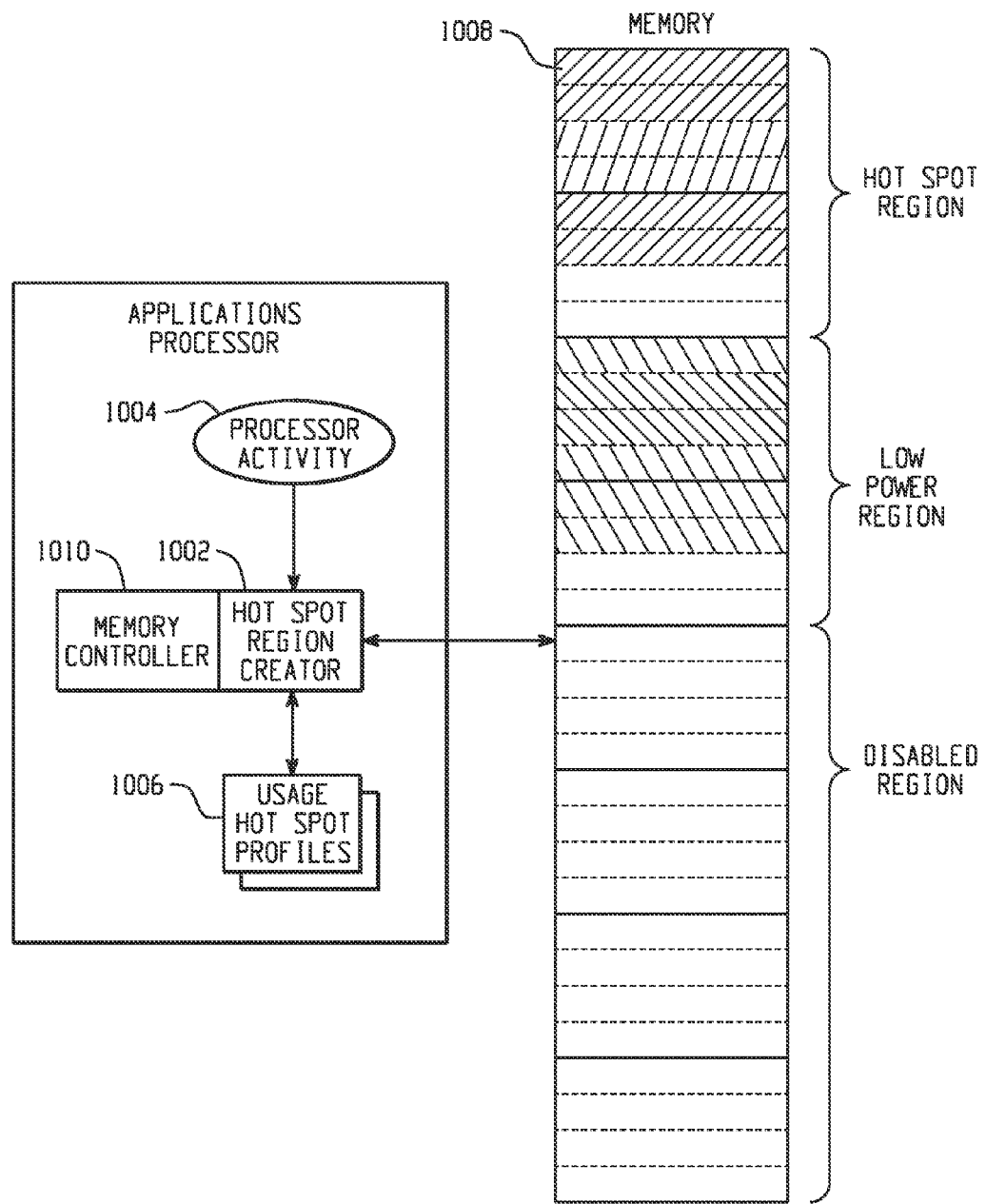
FIG. 10 is a block diagram depicting a determination of activity levels via usage hot spot profiles.

It is noted that in different implementations, power modes may be assigned at different levels of granularity. For example, in one implementation, power modes may be assigned at the bank level. In another example, power modes may be assigned at the region level. When power modes may be assigned at a higher level (e.g., chip level) of granularity than the level at which activity levels are assigned (e.g., power modes assigned at the bank level while activity levels are determined at the page level), the rearranging may be adjusted so that data from different activity level regions is assigned to different portions (e.g., banks) of memory (as depicted in FIG. 10 below).

Figure 8:
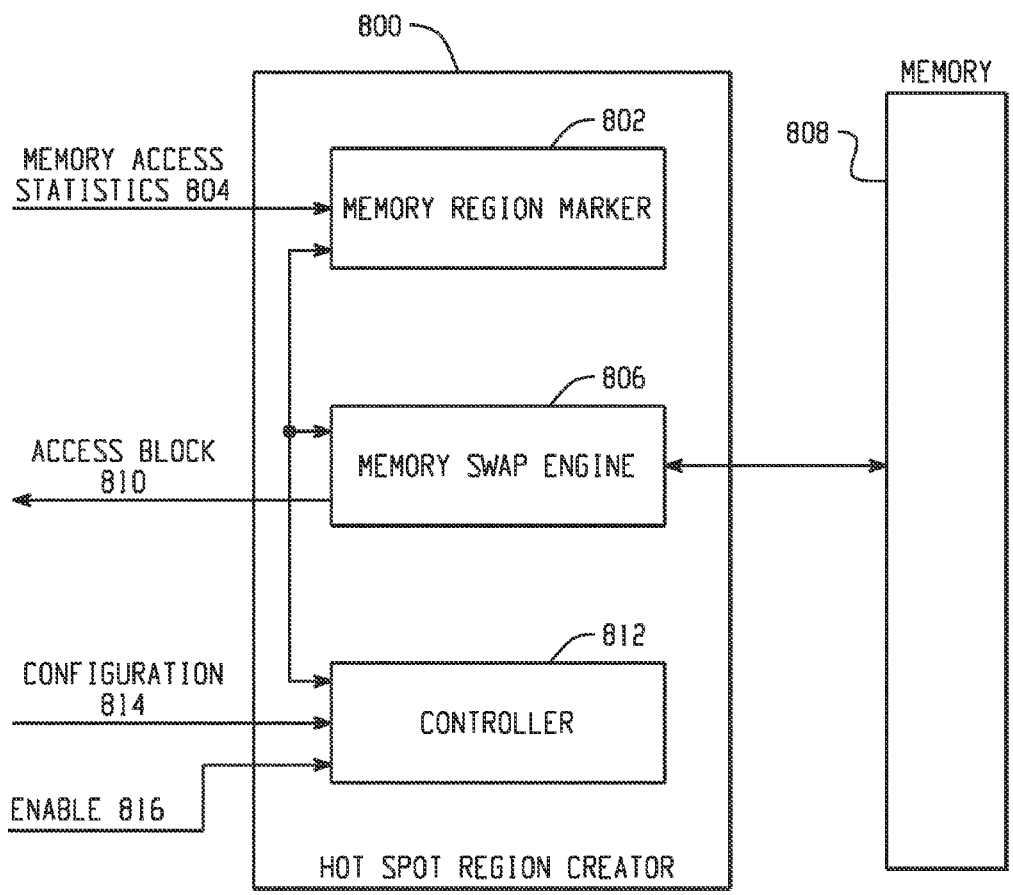
FIG. 8 is a block diagram depicting example components of a hot spot region creator.

FIG. 8 is a block diagram depicting example components of a hot spot region creator 800. A memory region marker 802 is configured to determine an activity level for each of a plurality of regions of memory. The memory region marker 802 makes these determinations based on received memory access statistics 804. These memory access statistics 804 may describe the distribution of memory accesses during a recent time period. In another example, the memory access statistics 804 may describe an expected distribution of memo access based on a variety of factors, such as a current application being run, a current activity, task, or thread being operated by the current application, or the current operating system being run.

A memory swap engine 806 interacts with the memory 808 to affect the rearranging of data within the memory. For example the memory swap engine 806 may rearrange the data in the memory 808 to position the active region data in a contiguous active portion of memory and to position the inactive region data in a contiguous inactive portion of memory. The memory swap engine 806 may rearrange the data by moving and swapping data among a plurality of regions, such as memory bank regions to position data of similar activity levels together. The memory swap engine 806 provides an access block signal 810 that prevents access to certain portions of the memory 808 during rearranging to prevent corruption of the data or access to indeterminate data values. A controller 812 interacts with the memory region marker 802 and the memory swap engine 806 based on received configuration 814 and enable 816 signals. The configuration signal 814 may specify a number of parameters, such as the number of different activity levels (e.g., high activity, low activity, occupied inactive activity, unoccupied inactive activity) that may be determined by the memory region marker 802 as well as thresholds (e.g., number of memory accesses) that delimit the different activity levels.

Figure 9:
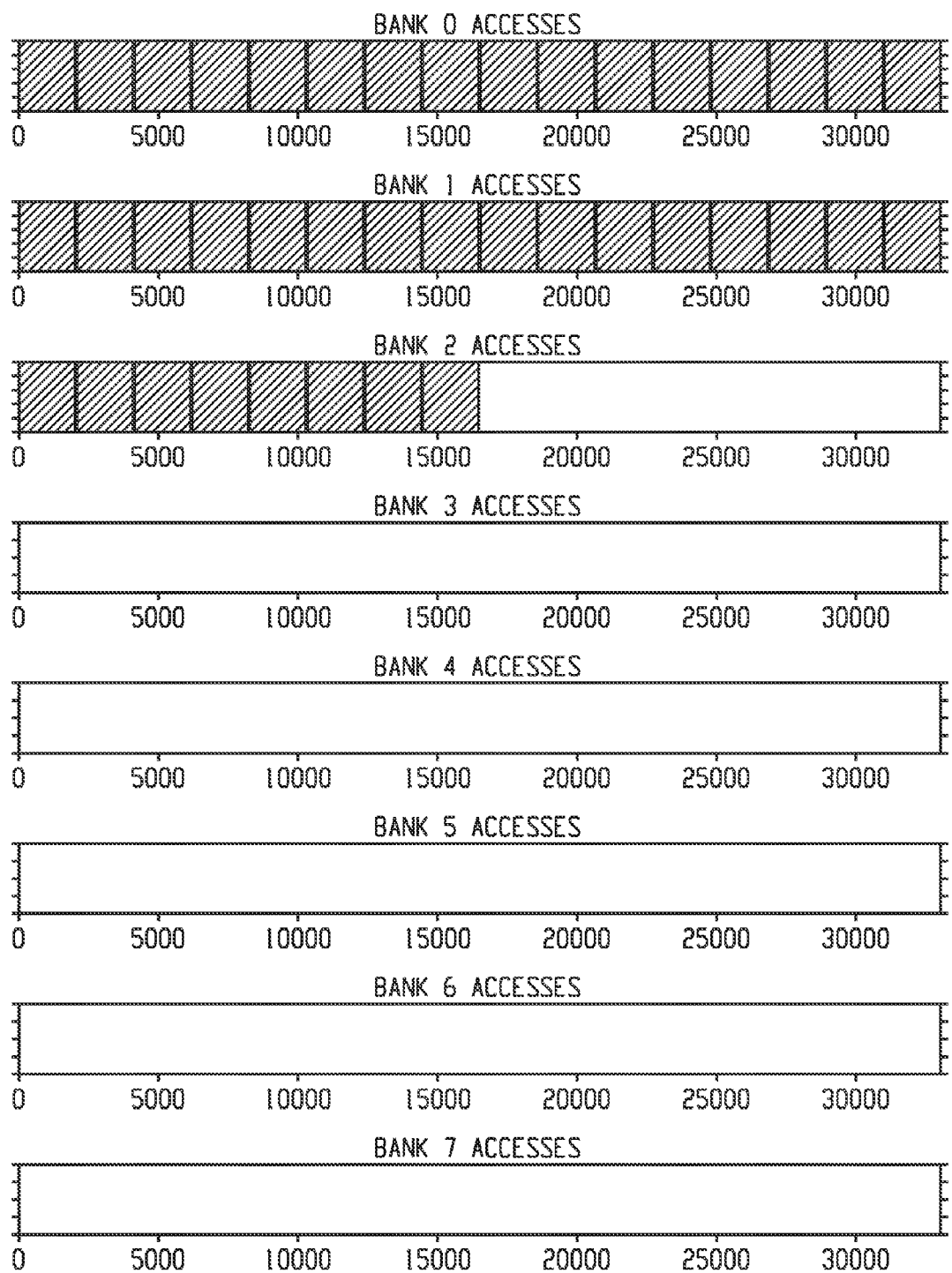
FIG. 9 is a diagram depicting an example memory following rearrangement of data.

FIG. 9 is a diagram depicting an example memory following rearrangement of data. The memory 902 has been rearranged so that active region data, denoted by solid blocks, has been positioned in a contiguous active portion of memory in Bank 0, Bank 1, and Bank 2. The inactive region data, denoted by white space, has been positioned in a contiguous inactive portion of memory in Bank 3, Bank 4, Bank 5, Bank 6, and Bank 7. In one example, a memory controller is configured to place the contiguous inactive portion of memory comprising bank 3, Bank 4, Bank 5, Bank 6, and Bank 7 into a low power or disabled mode to affect power savings.

FIG. 10 is a block diagram depicting a determination of activity levels via usage hot spot profiles. A hot spot region creator 1002 receives a processor activity type 1004 that represents a type of current or upcoming activity by a processor. For example, the processor activity 1004 may identify a current operating system, a currently operating application, or a current/upcoming task, activity, or process of the processor. Based on the processor activity 1004, the hot spot region creator 1002 accesses one of a plurality of usage hot spot profiles 1006. A usage hot spot profile 1006 is based on the expected distribution of memory accesses for a particular processor activity. For example, when a current processor activity is associated with playback of a video file, memory accesses tend to follow a particular distribution. In contrast, when the current processor activity is solving a non-deterministic polynomial-time hard problem, the distribution of memory accesses may be quite different. The usage hot spot profiles 1006 indicate, for particular processor activities, which areas of the memory 1008 are likely to be active regions and which areas of the memory 1008 are likely to be inactive regions. The hot spot region creator 1002 accesses a usage hot spot profile 1006 based on the received processor activity 1004 and determines an activity level for each of a plurality of the memory 1008 using the accessed usage hot spot profile 1006. The hot spot region creator 1002 rearranges the data to position the active region data in a contiguous active portion of memory (the hot spot region) and to position the inactive region data in a contiguous inactive portion of memory (the low power region and/or the disabled region). The memory controller 1010 adjusts the power profile of the different regions of the memory 1008 to match the expected activity levels.

The usage hot spot profiles 1006 enable dynamic adjustment of the power profiles of different regions of the memory based on the current or upcoming processor activity 1004. When the processor activity 1004 changes or is preparing to change, that processor activity 1004 is provided to the hot spot region creator 1002. The hot spot region creator 1002 accesses a usage hot spot profile 1006 based on the newly received processor activity 1004. The hot spot region creator 1002 determines an activity level for each of the plurality of regions of the memory based on the newly accessed usage hot spot profile 1006 and rearranges data in the memory based on the newly determined activity levels. The memory controller 1010 then adjusts the power profiles of different regions of the memory 1008 based on the rearranged data. Such a configuration enables a system to provide memory power consumption control that is closely tailored to the activity of a processor.

Figure 11:
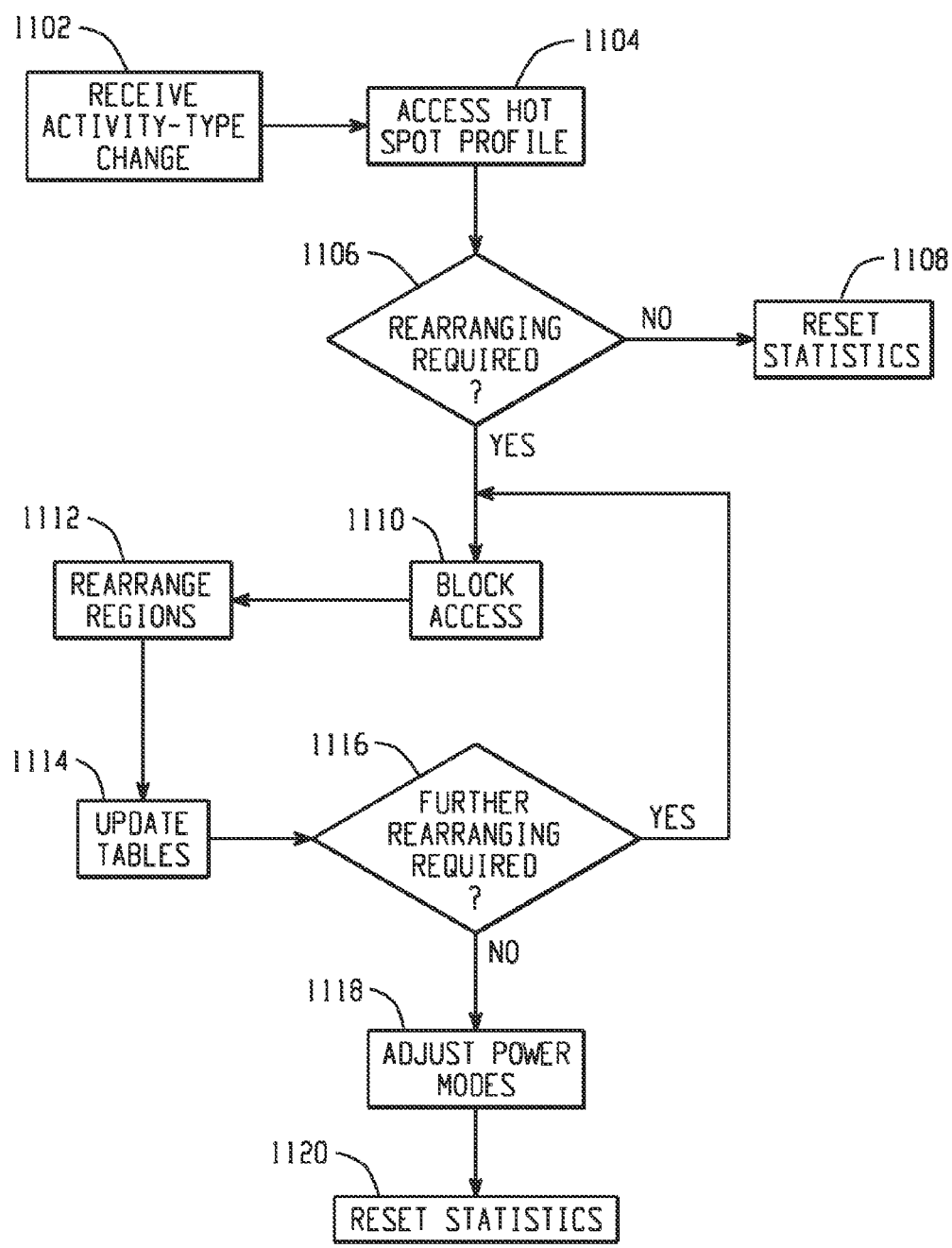
FIG. 11 is a flow diagram depicting the adjustment of power modes of a memory.

FIG. 11 is a flow diagram depicting the adjustment of power modes of a memory. At 1102, change in a processor activity type is received, and at 1104 a hot spot profile is accessed based on the received activity type. At 1106, a determination is made as to whether data needs to be rearranged based on the accessed hot spot profile (no rearranging may be necessary of the hot spot profile accessed at 1104 indicates no changes to the activity levels of the regions of memory). If no changes are necessary, at 1108, certain memory access counters and other statistics may be reset, and the process terminates. If rearranging is necessary, at 1110, access to certain regions of the memory is temporarily blocked to prevent indeterminate results or data corruption during rearranging. At 1112, regions of data are rearranged based on activity levels determined using the hot spot profile. At 1114, translation tables, such as a data rearrangement map, are updated to enable location of data in the memory after the data has been rearranged. At 1116, a determination is made as to whether further rearranging memory in another memory needs rearranged based on the hot spot profile) is needed. If further rearranging is necessary, the 'yes' branch is taken and further rearranging is performed at 1110, 1112, 1114. If no further rearranging is needed, at 1118, power modes for different regions of the memory are adjusted, access to the memory is restored, at 1120, certain statistics are reset, and the process terminates.

Figure 12:
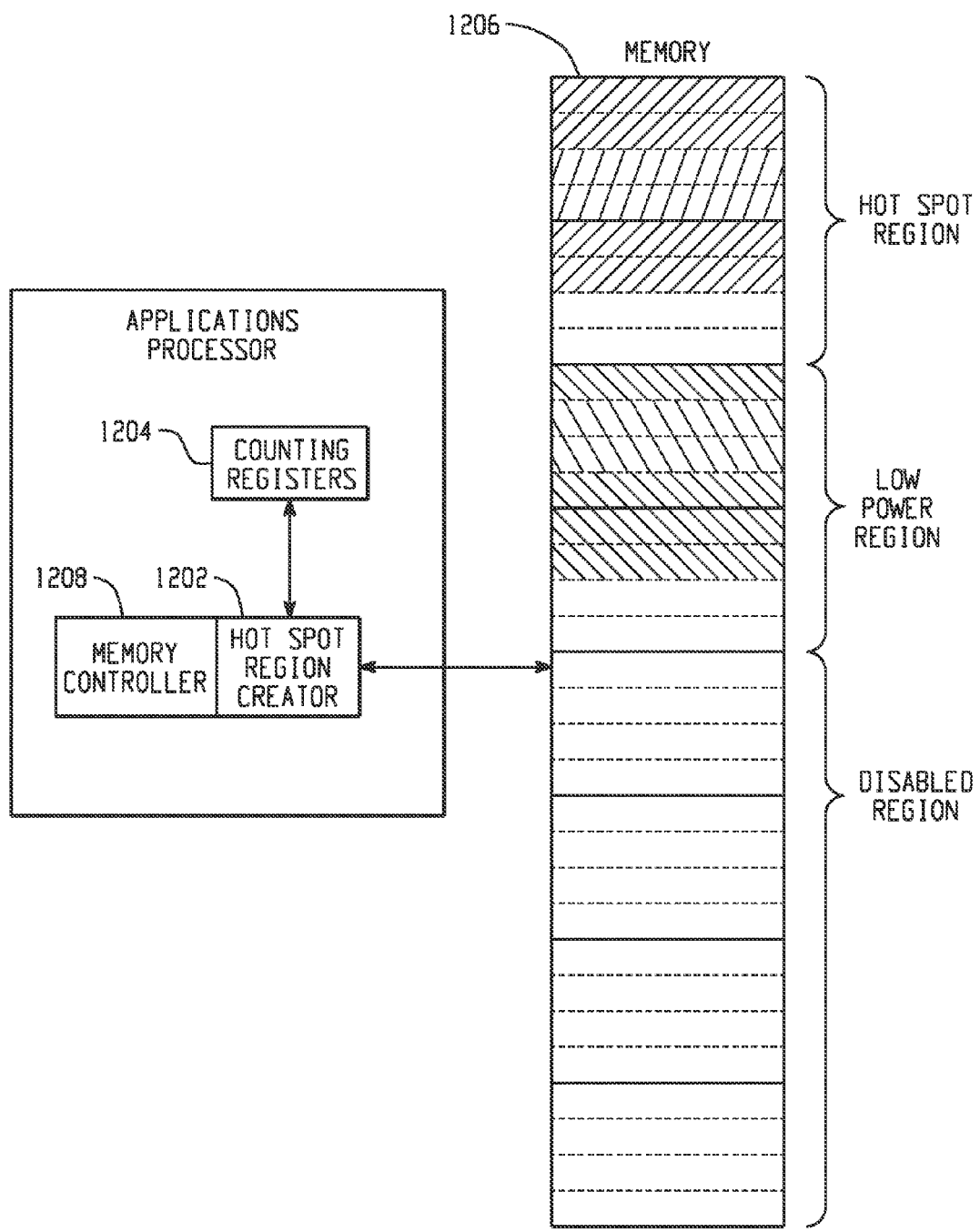
FIG. 12 is a block diagram depicting a system that controls memory power modes based on a recent distribution of memory accesses.

FIG. 12 is a block diagram depicting a system that controls memory power modes based on a recent distribution of memory accesses. A hot spot region creator 1202 interacts with one or more counting registers 1204. The counting registers 1204 are configured to count access requests (e.g., memory read and memory write requests) to each of a plurality of regions of a memory 1206. Thus, the counting registers 1204 develop a recent distribution of memory accesses. The hot spot region creator 1202 identities which regions of the memory are active or inactive based on the count values of the counting registers 1204. For example, a region of memory may be deemed to be an active region of memory when that region is accessed more than a threshold number of times during a particular time period or when accesses to that region make up more than a threshold proportion of all memory accesses during that time period. Upon the occurrence of a triggering event (e.g., the passage of a threshold time period, a change in processor activity), the hot spot region creator 1202 rearranges the data in the memory 1206 based on the activity levels determined using the counting registers 1204 counts. A memory controller 1208 adjusts the power levels for different regions of the memory 1206 based on the activity levels. The implementation of a hot spot region creator 1202 depicted in FIG. 12 enables control of memory power consumption based on recent system activity.

Figure 13:
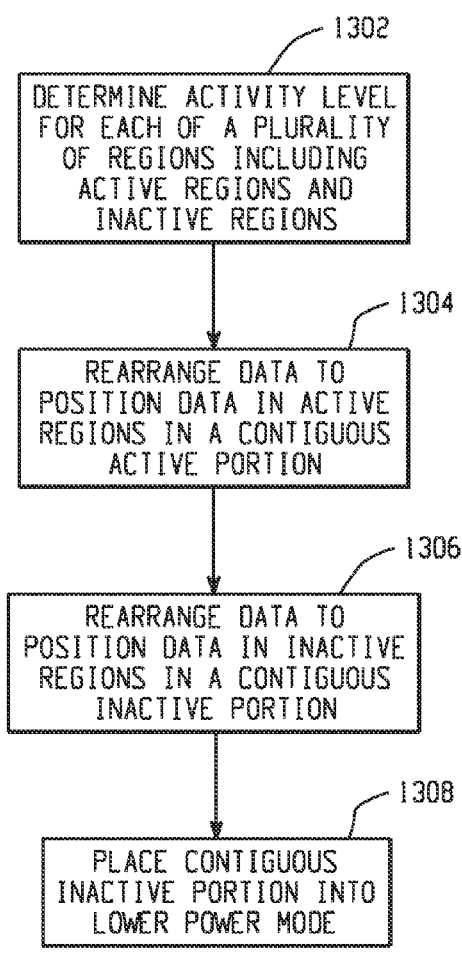
FIG. 13 is a flow diagram depicting a method for placing a portion of a memory into a low power mode.

FIG. 13 is a flow diagram depicting a method for placing a portion of a memory into a low power mode. At 1302, an activity level for each of a plurality of regions of a memory is determined, where certain of the regions contain data, where certain of the regions are determined to be active regions, and where certain of the regions are determined to be inactive regions. At 1304, the data is rearranged to position active region data in a contiguous active portion of memory. At 1306, the data is rearranged to position inactive region data in a contiguous inactive portion of memory. At 1308, the contiguous inactive portion of memory is placed into a low power or disabled mode or operation.

Figure 14:
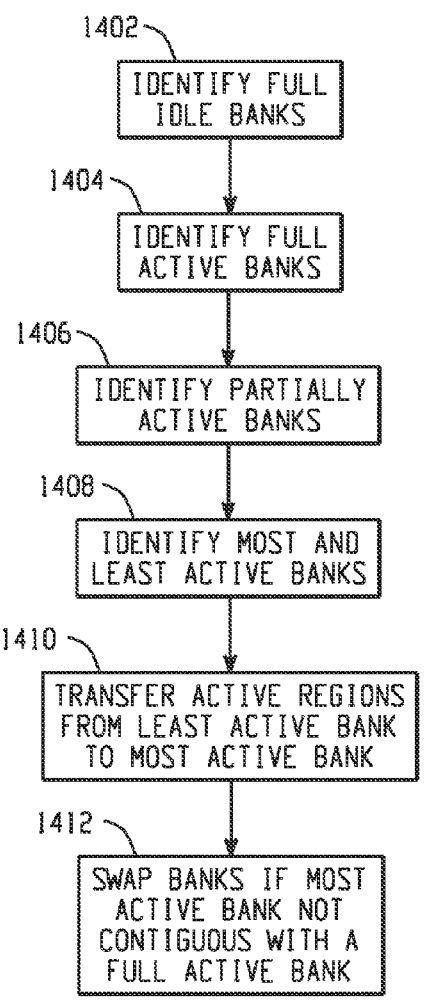
FIG. 14 is a flow diagram depicting a process of rearranging data in a memory.

FIG. 14 is a flow diagram depicting a process of rearranging data in a memory. The memory includes a plurality of memory banks, where each memory bank includes a plurality of memory bank regions. At 1402, memory banks having zero active regions are identified as full sleep (idle) banks, and at 1404, memory banks having zero inactive regions are identified as full active banks. At 1406, memory banks having more than zero active regions and more than zero inactive regions are identified as partially active banks. Of the partially active banks, a most active bank and a least active bank are identified at 1408. At 1410, active regions from the least active bank are transferred to the most active bank. At 1412, the most active bank is swapped with another bank when the most active bank is not contiguous with one of the full active banks to group the active banks together. The swap may be a physical swap, swapping data from one memory bank to another, or the swap may be a logical swap that adjusts the bank number identifier associated with the two swapped memory banks.

The identification of the most active bank and the least active bank at 1408 may be implemented in a variety of ways. In one example, the partially active bank that has the most active regions is identified as the most active bank, and the partially active bank having the least number of active regions is identified as the least active bank. In another example, the partially active bank that is closest to an identified target section of the memory (e.g., the low address portion of the memory, the high address portion of the memory, a specified middle address portion of the memory) is identified as the most active bank, and the partially active hank closest to a distant section of memory is identified as the least active bank. In a further example, the partially active bank or full sleep bank that is closest to an identified target section of the memory is identified as the most active bank, and the partially active bank closest to a distant section of memory is identified as the least active bank.

Figure 15:
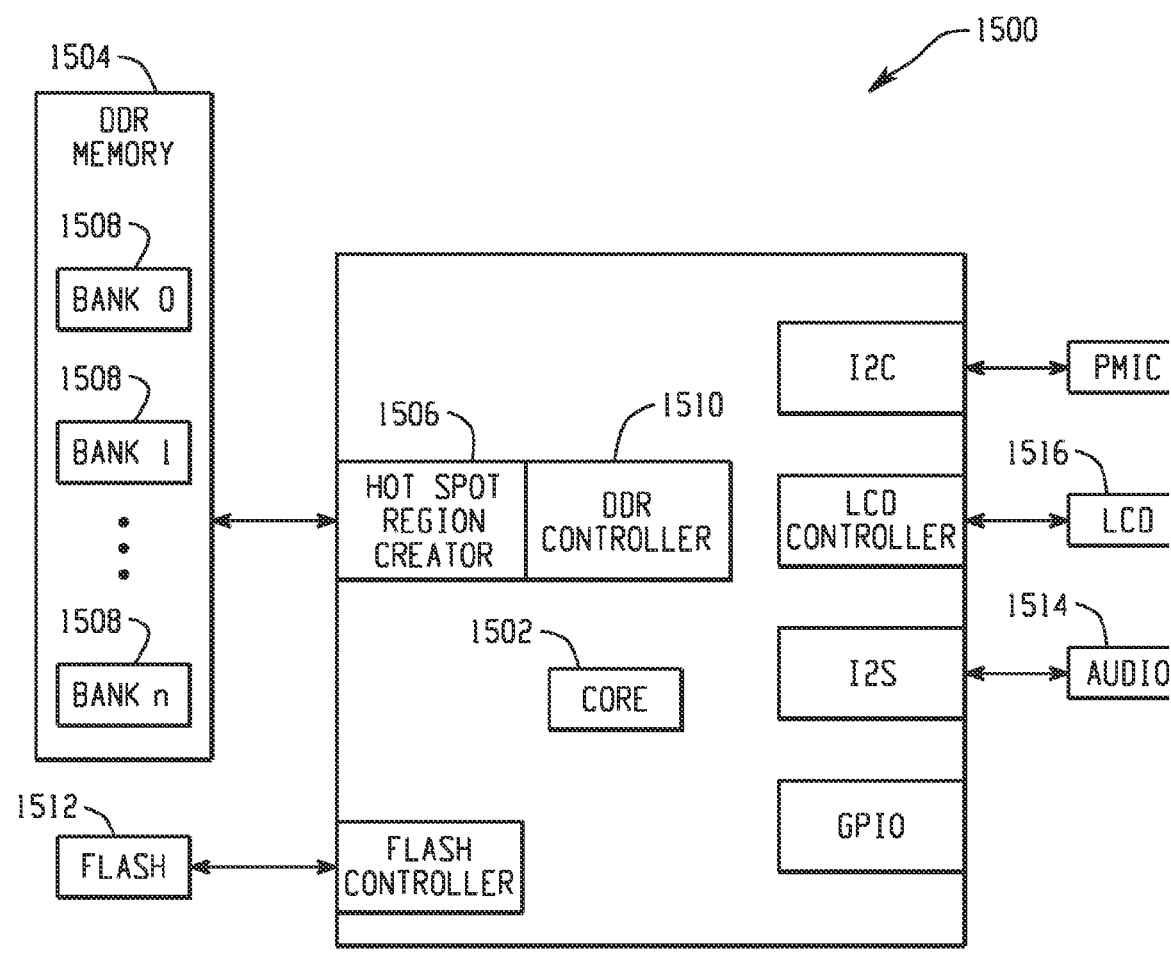
FIG. 15 is a block diagram depicting a system on chip configured to place a portion of a memory into a low power mode.

FIG. 15 is a block diagram depicting a system on chip 1500 configured to place a portion of a memory into a low power mode. The system 1500 includes a core data processor 1502 and a non-transitory computer-readable medium 1504, depicted as a DDR memory that is responsive to the core data processor 1502. The system 1500 includes a hot spot region creator 1506 that is configured to determine an activity level for each of a plurality of regions of the memory 1504, such as the memory banks 1508 and regions, rows, or other delimitations of those memory banks 1508. The hot spot region creator 1506 is further configured to rearrange the data of the memory 1504 to position the active region data in a contiguous active portion of memory 1504 and to position the inactive region data in a contiguous inactive portion of the memory 1504. A memory controller 1510 is configured to place the contiguous inactive portion e.g., certain memory banks 1508) into a lower power mode. The system 1500 also includes other peripherals and associated interfaces, such as a flash memory 1512, an audio peripheral 1514, and a liquid crystal display 1516. These peripherals may interact with the memory 1504 directly, such as via direct memory access (DMA) or may interact with the memory 1504 via the memory controller 1510 or other intermediate hardware.

This application uses examples to illustrate the invention. The patentable scope of the invention may include other examples.

What is claimed is:

1. A method of placing a portion of a memory into a low power mode, comprising:
    receiving an activity type that represents a type of current or upcoming activity by a processor;
    accessing one hot spot profile of a plurality of hot spot profiles based on the activity type;
    determining an activity level for each of a plurality of regions of a memory, wherein certain of the regions are determined to be active regions, and wherein certain of the regions are determined to be inactive regions, and wherein the accessed hot spot profile is used to determine the activity level for the regions, wherein which regions are determined to be active regions and which regions are determined to be inactive regions varies across the plurality of hot spot profiles;
    positioning data of the active regions in a contiguous active portion of the memory and positioning data of inactive regions in a contiguous inactive portion of the memory; and
    placing the contiguous inactive portion of memory into a low power mode.

2. The method of claim 1, wherein certain of the regions are determined to be occupied but inactive regions,
    wherein the data is rearranged to position the occupied but inactive regions in a contiguous occupied portion of memory,
    wherein the contiguous occupied portion of memory is placed in another low power mode that differs from the low power mode.

3. The method of claim 1, wherein the low power mode disables the contiguous inactive portion of memory.

4. The method of claim 1, wherein the regions of the memory are pages of the memory, and wherein the contiguous inactive portion of memory that is put into the low power mode comprises one or more memory banks.

5. The method of claim 1, further comprising:
    receiving an updated activity type;
    accessing a different hot spot profile based on the updated activity type; and
    rearranging the data based on the different hot spot profile.

6. The method of claim 1, further comprising:
    counting a number of accesses to each of the plurality of regions of the memory over a period of time,
    wherein activity level for each of the plurality of regions is determined based on the counted numbers of accesses; and
    wherein the data is rearranged based on a triggering event.

7. The method of claim 6, wherein the triggering event is a passage of time or a change in an activity type of a processor.

8. The method of claim 1, wherein the memory includes a plurality of memory banks, wherein each memory bank includes a plurality of memory bank regions, and wherein rearranging the data further comprises:
    identifying memory banks having zero active regions as full sleep banks;
    identifying memory banks having zero inactive regions as full active banks;
    identifying memory banks having more than zero active regions and more than zero inactive regions as partially active banks;
    identifying a partially active bank having a most active regions as a most active bank;
    identifying a partially active bank having a least active regions as a least active bank;
    transferring active regions from the least active bank to the most active bank; and
    swapping the most active bank with another bank when the most active bank is not contiguous with one of the full active banks.

9. The method of claim 1, wherein the memory includes a plurality of memory banks, wherein the memory banks are arranged contiguously from a target section to a distant section, wherein each memory bank includes a plurality of memory bank regions, and wherein rearranging the data further comprises:

identifying memory banks having zero active regions as full sleep banks;
identifying memory banks having zero inactive regions as full active banks;
identifying memory banks having more than zero active regions and more than zero inactive regions as partially active banks;
identifying a partially active bank closest to the target section as a most active bank;
identifying a partially active bank closest to the distant section as a least active bank;
transferring active regions from the least active bank to the most active bank; and
swapping the most active bank with another bank when the most active bank is not contiguous with one of the full active banks.

10. The method of claim 1, wherein the memory includes a plurality of memory banks, wherein the memory banks are arranged contiguously from a target section to a distant section, wherein each memory bank includes a plurality of memory bank regions, and wherein rearranging the data further comprises:
identifying memory banks having zero active regions as full sleep banks;
identifying memory banks having zero inactive regions as full active banks;
identifying memory banks having more than zero active regions and more than zero inactive regions as partially active banks;
identifying a partially active bank or a full sleep bank closest to the target section as an identified bank;
identifying a partially active bank closest to the distant section as a least active bank;
transferring active regions from the least active bank to identified bank; and
swapping the identified bank with another bank when the identified bank is not contiguous with one of the full active banks.

11. A system configured to place a portion of a memory into a low power mode, comprising:
a hot spot region creator configured to:
receive an activity type that represents a type of current or upcoming activity by a processor;
access one hot spot profile of a plurality of hot spot profiles based on the activity type;
determine an activity level for each of a plurality of regions of a memory, wherein certain of the regions are determined to be active regions, and wherein certain of the regions are determined to be inactive regions, and wherein the accessed hot spot profile is used by the hot spot region creator to determine the activity level for the regions, wherein which regions are determined to be active regions and which regions are determined to be inactive regions varies across the plurality of hot spot profiles; and
position data of the active regions in a contiguous active portion of the memory and position data of the inactive region in a contiguous inactive portion of the memory; and
a memory controller configured to place the contiguous inactive portion of memory into a low power mode.

12. The system of claim 11, wherein the hot spot region creator is configured to determine that certain of the regions are occupied but inactive regions,
wherein the hot spot region creator is configured to rearrange the data to position the occupied but inactive regions in a contiguous occupied portion of memory,
wherein the memory controller is configured to place the contiguous occupied portion of memory in a second low power mode that differs from the low power mode.

13. The system of claim 11, wherein the hot spot region creator further configured to:
receive an updated activity type;
access a different hot spot profile based on the updated activity type; and
rearrange the data based on the different hot spot profile.

14. The system of claim 11, further comprising:
a counter configured to count a number of accesses to each of the plurality of regions of the memory over a period of time,
wherein the hot spot region creator is configured to determine an activity level for each of the plurality of regions based on the counted numbers of accesses; and
wherein the hot spot region creator is configured to rearrange the data based on a triggering event.

15. The system of claim 11, wherein the memory includes a plurality of memory banks, wherein each memory bank includes a plurality of memory bank regions, and wherein the hot spot region creator is configured to rearrange the data by:
identifying memory banks having zero active regions as full sleep banks;
identifying memory banks having zero inactive regions as full active banks;
identifying memory banks having more than zero active regions and more than zero inactive regions as partially active banks;
identifying a partially active bank having a most active regions as a most active bank;
identifying a partially active bank having a least active regions as a least active bank;
transferring active regio is from the least active bank to the most active bank; and
swapping the most active bank with another bank when the most active bank is not contiguous with one of the full active banks.

16. The system of claim 11, wherein the memory includes a plurality of memory banks, wherein the memory banks are arranged contiguously from a target section to a distant section, wherein each memory bank includes a plurality of memory bank regions, and wherein the hot spot region creator is configured to rearrange the data by:
identifying memory banks having zero active regions as full sleep banks;
identifying memory banks having zero inactive regions as full active banks;
identifying memory banks having more than zero active regions and more than zero inactive regions as partially active banks;
identifying a partially active bank closest to the target section as a most active bank;
identifying a partially active bank closest to the distant section as a least active bank;
transferring active regions from the least active bank to the most active bank; and
swapping the most active bank with another bank when the most active bank is not contiguous with one of the full active banks.

17. The system of claim 11, wherein the memory includes a plurality of memory banks, wherein the memory banks are arranged contiguously from a target section to a distant section, wherein each memory bank includes a plurality of memory bank regions, and wherein the hot spot region creator is configured to rearrange the data by:

identifying memory banks having zero active regions as full sleep banks;
identifying memory banks having zero inactive regions as full active banks;
identifying memory banks having more than zero active regions and more than zero inactive regions as partially active banks;
identifying a partially active bank or a full sleep bank closest to the target section as an identified bank;
identifying a partially active bank closest to the distant section as a least active bank;
transferring active regions from the least active bank to the identified bank; and
swapping the identified bank with another bank when the identified bank is not contiguous with one of the full active banks.

18. A system on chip configured to place a portion of a memory into a low power mode, comprising:
a data processor;
a non-transitory computer-readable memory that is responsive to the data processor;
a hot spot region creator configured to:
receive an activity type that represents a type of current or upcoming activity by a processor;
access one hot spot profile of a plurality of hot spot profiles based on the activity type;
determine an activity level for each of a plurality of regions of a memory, wherein certain of the regions are determined to be active regions, and wherein certain of the regions are determined to be inactive regions, and wherein the accessed hot spot profile is used by the hot spot region creator to determine the activity level for the regions, wherein which regions are determined to be active regions and which regions are determined to be inactive regions varies across the plurality of hot spot profiles; and
position data of the active regions in a contiguous active portion of the memory and position data of the inactive region in a contiguous inactive portion of the memory; and
a memory controller configured to place the contiguous inactive portion of memory into a low power mode.

* * * * *